United States Patent
Esteve et al.

(10) Patent No.: US 9,760,215 B2
(45) Date of Patent: Sep. 12, 2017

(54) METHOD FOR DETECTING A TOUCH-AND-HOLD TOUCH EVENT AND CORRESPONDING DEVICE

(71) Applicant: Elo Touch Solutions, Inc., Menlo Park, CA (US)

(72) Inventors: Simon Esteve, Rambouillet (FR); Olivier Schevin, La Plaine Saint Denis (FR); Joel C. Kent, Fremont, CA (US)

(73) Assignee: Elo Touch Solutions, Inc., Menlo Park, CA (US)

( * ) Notice: Subject to any disclaimer, the term of this patent is extended or adjusted under 35 U.S.C. 154(b) by 144 days.

(21) Appl. No.: 13/650,798

(22) Filed: Oct. 12, 2012

(65) Prior Publication Data

US 2013/0093732 A1    Apr. 18, 2013

(30) Foreign Application Priority Data

Oct. 14, 2011   (EP) ..................................... 11290476

(51) Int. Cl.
*G06F 3/043*   (2006.01)
*G06F 1/16*   (2006.01)
*G06F 7/38*   (2006.01)

(52) U.S. Cl.
CPC .............. *G06F 3/043* (2013.01); *G06F 1/169* (2013.01); *G06F 7/388* (2013.01)

(58) Field of Classification Search
CPC ......... G06F 1/169; G06F 3/043; G06F 3/0436
USPC ...................... 345/173–184; 178/18.01–20.04
See application file for complete search history.

(56) References Cited

U.S. PATENT DOCUMENTS

| | | | | |
|---|---|---|---|---|
| 4,689,448 A | * | 8/1987 | Snyder | G06F 3/043 178/18.07 |
| 5,115,808 A | * | 5/1992 | Popovic | A61B 5/0051 600/438 |
| 5,500,492 A | * | 3/1996 | Kobayashi | G06F 3/0433 178/18.04 |
| 5,561,613 A | * | 10/1996 | Kobayashi | G06F 3/043 178/18.04 |
| 6,130,663 A | | 10/2000 | Null | |
| 6,654,008 B2 | * | 11/2003 | Ikeda | G06F 3/03545 178/19.01 |
| 8,547,356 B2 | * | 10/2013 | Maloney | G06Q 10/00 345/173 |

(Continued)

FOREIGN PATENT DOCUMENTS

EP    1 512 116 A2    3/2005
EP    2 214 082 A1    8/2010

(Continued)

OTHER PUBLICATIONS

Extended European Search Report from European Patent Application No. 11290476.8 dated Jun. 20, 2012.

*Primary Examiner* — Vinh Lam
(74) *Attorney, Agent, or Firm* — Alston & Bird LLP

(57) ABSTRACT

Methods for determining a touch-and-hold touch event on a touch sensitive interaction surface of a touch sensing device are provided and comprise the steps of: a) determining a touch location of the touch event based on vibrations, such as bending waves, propagating through the interaction surface and b) determining whether the touch event comprises a hold touch event based on a sensed airborne signal. A device configured to carry out such methods is also provided.

27 Claims, 7 Drawing Sheets

(56) References Cited

U.S. PATENT DOCUMENTS

Figure 1A:
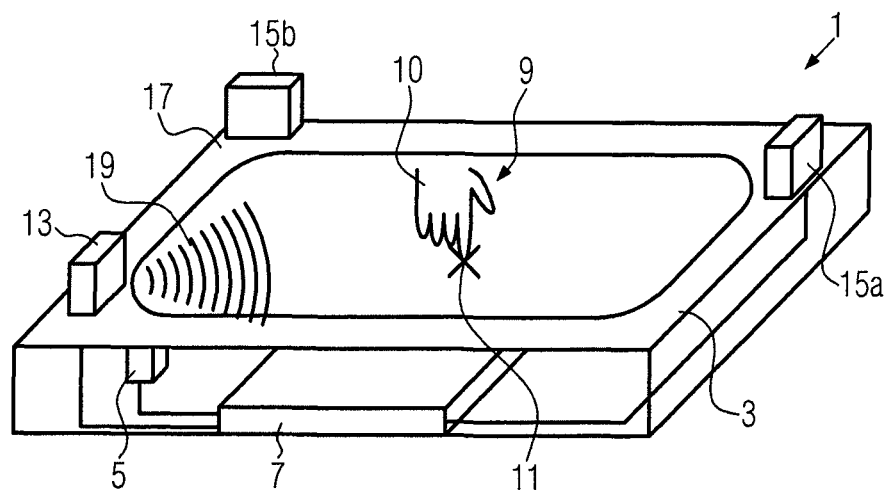

| | | | | |
|---|---|---|---|---|
| 8,624,878 B2* | 1/2014 | Sarwar | ............... | G06F 3/016 178/18.01 |
| 8,659,579 B2* | 2/2014 | Nadjar | ............... | G06F 3/043 345/177 |
| 8,749,517 B2* | 6/2014 | Aklil | ............... | G06F 3/0418 178/18.04 |
| 2001/0020936 A1* | 9/2001 | Tsuji | ............... | G06F 3/03545 345/177 |
| 2002/0070055 A1* | 6/2002 | Collier | ............... | G06F 3/03545 178/18.01 |
| 2004/0173389 A1* | 9/2004 | Sullivan | ............... | G06F 3/0436 178/18.04 |
| 2006/0071912 A1* | 4/2006 | Hill | ............... | G06F 3/043 345/173 |
| 2006/0139340 A1* | 6/2006 | Geaghan | ............... | G06F 3/0416 345/177 |
| 2006/0262104 A1 | 11/2006 | Sullivan et al. | | |
| 2006/0279548 A1* | 12/2006 | Geaghan | ............... | G06F 3/0416 345/173 |
| 2006/0284854 A1* | 12/2006 | Cheng | ............... | G06F 3/03545 345/173 |
| 2007/0057923 A1* | 3/2007 | Kitazaki | ............... | G06F 3/0481 345/173 |
| 2009/0153478 A1* | 6/2009 | Kerr | ............... | H04N 5/4403 345/158 |
| 2009/0273583 A1* | 11/2009 | Norhammar | ............... | G06F 3/0436 345/177 |
| 2011/0025649 A1* | 2/2011 | Sheikhzadeh Nadjar | ............... | G06F 3/043 345/177 |
| 2012/0327746 A1* | 12/2012 | Velusamy | ............... | G01S 3/86 367/127 |
| 2013/0057502 A1* | 3/2013 | Aklil | ............... | G06F 3/0418 345/174 |
| 2013/0069916 A1* | 3/2013 | Esteve | ............... | G06F 3/041 345/177 |
| 2013/0155031 A1* | 6/2013 | Dahl | ............... | G06F 3/0412 345/177 |
| 2013/0181951 A1* | 7/2013 | Klinghult | ............... | G06F 3/0416 345/177 |
| 2013/0293505 A1* | 11/2013 | Krishnamurthy | ............... | G06F 3/0488 345/173 |

FOREIGN PATENT DOCUMENTS

| | | | | |
|---|---|---|---|---|
| FR | WO 2012010303 A1 * | 1/2012 | ............ | G06F 3/0414 |
| WO | WO 01/95083 A2 | 12/2001 | | |
| WO | WO 2004/102301 A2 | 11/2004 | | |
| WO | WO 2006/133018 A2 | 12/2006 | | |
| WO | WO 2011093837 A2 * | 8/2011 | ............ | G06F 3/043 |
| WO | WO 2011093837 A3 * | 1/2012 | ............ | G06F 3/043 |

* cited by examiner

METHOD FOR DETECTING A TOUCH-AND-HOLD TOUCH EVENT AND CORRESPONDING DEVICE

FIELD OF THE INVENTION

The invention relates to a method for determining a touch-and-hold touch event on a touch sensitive interaction surface of a touch sensing device and also to a touch sensing device comprising a touch sensitive interaction surface to carry out such a method.

BACKGROUND OF THE INVENTION

Touch sensitive devices such as touch screens are widely used as input devices for providing instructions to an electronic device, like a mobile phone, an electronic book reader, a laptop or vending and automatic teller machines. Various technologies exist to enable this functionality, like the capacitive or resistive touch sensitive technology but also acoustic based technologies based on surface acoustic waves or on bending waves propagating inside the interaction surface.

Touch sensitive devices based on bending waves determine a position of an impact on a touch sensitive surface of the device based on the analysis of the propagation of the bending wave created due to the impact realized by the user when touching the touch sensitive interaction surface. EP 1512116 A1 describes such a method.

An important functionality of the touch sensitive device is the capability to discriminate a simple touch event corresponding to a simple tap from a touch-and-hold event during which the user keeps his finger in contact with the touch sensitive interface to provide a different instruction to the device compared to the simple touch event. This is comparable to a mouse click and a mouse click down action.

To provide this functionality, EP 2 214 082 A1 proposed to combine the acoustic technology responsible for determining the touch location with a capacitor, responsible for determining the hold part of the touch event by identifying a capacitance change. Another solution is disclosed in prior art document US2006/0262104 proposing to analyse the frequency spectrum of the sensed acoustic signal to discriminate between touch down and touch-and-hold or to inject acoustic waves propagating inside interaction surface and to determine changes in the wave pattern.

It appears that the integration and/or calibration of these technologies are not always straight forward and not universal. Indeed, the response of the acoustic interface to injected acoustic waves into the interaction surface will strongly depend on the material used but also on the geometry of the device which could lead to unwanted reflections.

It is therefore a first object underlying this invention to provide a method that is capable of discriminating between touch events and touch-and-hold events that can be incorporated in a simple way into touch sensitive devices.

The use of touch sensitive devices is sometimes limited by particular properties of the electronic device into which the touch sensitive device is incorporated. This is, for instance, the case for clamshell laptop. Users of a clamshell laptop device are hesitating to use a touch sensitive functionality of the laptop screen due to a lack of a rigid support of the screen.

It is therefore a second object underlying this invention to provide an electronic device and corresponding method that provides a way to interact with the device similar to a touch sensitive device without, however, needing a physical contact between the user and the device.

SUMMARY OF THE INVENTION

The first object is achieved with the methods described herein. According to a specific embodiment, a method for determining a touch-and-hold touch event on a touch sensitive interaction surface of a touch sensing device according to claim 1. The method comprises the steps of: a) determining a touch location of the touch event based on vibrations, such as bending waves, propagating through the interaction surface and b) determining whether the touch event comprises a hold touch event based on a sensed airborne signal.

Using an airborne signal to determine whether the touch event is a touch-and-hold event or not has the advantage that physical properties of the materials used to build up the device and the interface geometries between different materials do not have to be taken into account.

In many applications the interaction surface takes the form of a more or less uniform plate for which propagating vibrations take the form of $A_0$ order Lamb waves, commonly referred to as bending waves. In the context of this document the term "bending waves" is to be interpreted generally as vibration propagation from the touch point to acoustic signal sensing means even if the interaction surface deviates in geometry and structure from a uniform plate.

In a preferred embodiment, step b) can comprise emitting an airborne signal propagating above and/or over the interaction surface and sensing properties of the emitted airborne signal. Using an active signal travelling above and/or over the surface of the interaction surface has the advantage that the presence or absence of a touch-and-hold event can determined in a reliable way.

Advantageously, the airborne signal can be an ultrasonic sound wave. This kind of signal can be used to detect the presence of an object or the movement of an object in a reliable way and can be implemented easily into a touch sensitive device.

Advantageously, in step b) the decision can be taken based on the presence or absence of motion determined based on the evolution of the sensed airborne signal. Indeed, a hold action is characterized by a resting finger or stylus on the interaction surface, whereas a tap is always accompanied by a motion after touching the interaction surface. The coordinates of the touch event are determined by analyzing the vibrations. Thus it is sufficient to detect motion or absence of motion, which simplifies the process.

According to a preferred embodiment, step b) can comprise determining whether the touch event comprises a hold touch event based on at least one of time of flight, echo delay, amplitude and/or phase distribution as function of frequency, etc. An analysis of these parameters does not need high processing capability, so that the decision can be taken with a simple yet reliable set-up. In many applications it may be sufficient to simply detect motion without determination of coordinate locations.

Preferably, during step b) the decision of the presence of a touch hold event is taken, if immediately following a detection of a touch location in step a), an absence of motion and an absence of a touch location are observed. The vibrations induced due to impact between the finger or stylus fade away on a rapid time scale, unless the user makes a sliding movement on the interface. In this case even if in step b) no motion is determined, the method still will determine that no hold action is present because due to detection of vibrations propagating in the interaction surface the sliding action can be determined. Thus the method not only can discriminate between touch and touch-and-hold, but also between touch-and-hold and drag interactions.

In a further preferred embodiment, the airborne signal can only emitted upon detection of vibrations propagating through the interaction surface during step a). This will improve the power consumption constraints of the device, in particular in case of a mobile or battery-operated device.

The object of the invention is also achieved with a computer readable medium including computer executable instructions stored thereon for performing the method as described above.

The object of the present invention is also achieved with the touch sensing device according to claim 9. The inventive electronic device comprises a touch sensitive interaction surface, an acoustic signal sensing means for sensing vibrations propagating through the interaction surface, an airborne signal emitter, an airborne signal sensing means and an analyzing unit configured to carry out the methods described herein. As a consequence, the touch-and-hold functionality can be achieved without having to adapt to varying materials, material compositions and/or geometries.

Preferably, the emitter can be configured to emit an ultrasonic wave propagating above and/or over the touch sensitive interaction surface. Ultrasonic waves are well suited to determine the presence or absence of motion when detecting changing echo delay, changing time of flight and/or changing amplitude and/or phase distributions as a function of frequency due to diffraction, reflection and/or shadowing of the emitted waves at the object interacting with the interaction surface.

According to a particular advantageous embodiment, the electronic device can comprise a telephone and/or camera means with a speaker and a microphone wherein the speaker is configured to emit the airborne signal and the microphone is configured to sense the airborne signal. In this particular case, no additional hardware is necessary thus reducing the overall cost of the device even in the presence of a touch-and-hold functionality.

According to a variant, the electronic device can further comprise a first element and a second element forming an angle $\alpha$ with respect to each other, the first element comprises at least one of the airborne signal emitter and of the at least one airborne signal sensing means for determining the hold touch event on the touch sensitive interaction surface and the second element comprises the touch sensitive interaction surface. In foldable devices, like e.g. laptops or foldable mobile phones, the spaces around the screen on the one element is typically rather limited so that it becomes difficult to arrange the airborne signal emitting and sensing means. By placing the emitting and sensing means on the surface of the other element, this difficulty can be overcome while at the same time ensuring a reliable determination of the hold touch event of a touch and hold touch event.

According to a further embodiment the airborne signal emitter and all airborne signal sensing means can be on or in the other element. Thus all hardware elements in relation to the airborne signal are positioned away from the element with the user interaction surface, so that e.g. the user interaction surface can cover a maximum amount of surface.

Advantageously, the analyzing unit can be furthermore configured to identify the hold touch event based on an airborne signal reflected off the at least one element comprising the touch sensitive interaction surface and sensed by at least one of the at least one airborne signal sensing means provided in or on the other element. Thus not only the signal reflected directly off the object like the user's hand or finger, can be exploited but in addition the sensed signal reflected off the object and then reflected a second time by the surface of the element comprising the touch sensitive interaction surface can be exploited therefore increasing the reliability of the method.

The second object of the invention is achieved by the electronic device according to claim 15. The inventive device comprises a first element with a first surface and a second element with a second surface, the first and second surface forming an angle $\alpha$ with respect to each other, a t least one means for emitting an airborne signal provided on or in the first element, at least one means for sensing airborne signals provided on or in the first element, and a means for analyzing sensed airborne signals, wherein the means for analyzing sensed airborne signals is configured to determine a position of at least one object relative to the second surface based on sensed airborne signals. Preferably, the airborne signals are ultrasound signals.

By analyzing an interaction between a user and the electronic device using airborne signals, the user does not have to touch the device and still a response can be provided by the electronic device that is comparable to a touch sensitive interaction surface. By providing the emitting and sensing means in the first element, no extra space needs to be reserved in the second element for these hardware components, like speakers and microphones.

Advantageously, the first and second element can be linked to each other by a hinge portion for adapting the angle $\alpha$. Thus a device can be provided that can be opened and closed by turning the first element relative to the second element around that hinge portion.

Preferably, the electronic device further comprises a means for determining the angle $\alpha$ between the first element and the second element. In particular in the case in which the airborne signal is used to determine the position of the object with respect to the second element, the information about the angle is used when determining the projection of the object onto the second element. Thus even with changing angle $\alpha$, the device will be able to determine the correct coordinates on the second element.

According to a variant, the analyzing unit can furthermore be configured to identify the angle $\alpha$ based on an airborne signal reflected off the second element and sensed by at least one of the at least one airborne signal sensing means provided in or on the first element. By comparing the sensed signal properties of the directly reflected signal and the signal reflected via the other element, the opening angle between the first and second element can be determined as a further parameter without needing additional sensing means.

According to a variant, the angle $\alpha$ can be less than 180°, in particular less than 160°, more in particular the angle $\alpha$ can be in a range between 45° and 160°. In these angular ranges users are typically using foldable electronic devices with a display on the second element and a keyboard on the first element. Using airborne signals the position of an object relative to the display of the second element can be determined in this range of angles.

Preferably, the means for analyzing sensed airborne signals is configured to determine the position of the object based on first airborne signals directly reflected off the object and second airborne signals that were reflected off the object and the second surface. The second airborne signals correspond to a further set of "virtual" emitting/receiving means and can be exploited to improve the precision of the position determination.

Preferably, the emitter and signal sensing means can be arranged in at least one of the edge regions of the first element. The emitter and signal sensing means can for instance be positioned next to a keyboard area present in the first region. By positioning the emitter and signal sensing means in the edge region, but sufficiently far away from the second element, the advantage of the virtual emitting/receiving means can still be exploited. To do so, the emitter and signal sensing means should be spaced away from the second element such that signals reflected off the second element can be sensed and discriminated from the direct signal path.

Advantageously, the means for analyzing sensed airborne signals can be configured to determine the position of the object in the plane of the second surface and/or perpendicular to the plane of the second surface. When determining the object with respect to the plane of the second element, the non touching interaction between the user and the second element can be interpreted like a touching interaction and thus the device will behave the same as in case a touch sensitive device was used. By also determining the distance with respect to the surface of the element a further parameter can be taken into account thereby enabling a 3D interaction between the user and the device.

According to a variant, the second element can further comprises a touch sensitive interaction surface with touch location determination means and the means for analyzing sensed airborne signals can be configured to determine the location of an object relative to the touch sensitive interaction surface but in an area outside the touch sensitive interaction surface. Thus in addition to a 2D interaction on the touch sensitive interaction surface, a 3D sensitive interaction means is enabled further increasing the ways a user can interact with the electronic device.

Preferably, the first element, the second element and the hinge portion can form a clamshell housing. For this kind of device, a user may hesitate to touch the second element as in normal use the second element is not rigidly supported. As a non touching interaction scheme is enabled using the airborne signals, it is still possible to interact with the device just as if a touch sensitive interaction surface was present.

The second object of the invention is also achieved with the method according to claim 25 and relating to a method for determining the position of at least one object relative to a device, wherein the device comprises a first element with a first surface and a second element with a second surface, the first and second surface forming an angle α with respect to each other, at least one means for emitting an airborne signal provided on or in the first element, at least one means for sensing airborne signals provided on or in the first element, and a means for analyzing sensed airborne signals, the method comprising the steps of: a) Sensing airborne signals, b) Identifying signals reflected directly off the object and signals reflected off the object and also reflected off of the second element, and c) Determining the position of the object based on the identified signals of step b). This method takes advantage of the fact that the signals that were not only reflected off the object but also reflected off the second element provide additional information, that can be attributed to virtual emitting devices and therefore enables the determination of the position of the object. In addition by having the emitting and sensing means on one element of the device and e.g. an interaction area on the second element no extra space has to be reserved to the emitting and sensing means on the second element. The method furthermore allows determining the position of the object in three dimensions with respect to the second element. This information can be used to identify user gestures in up to three dimensions which can be used to control the device. Depending on the amount of signals identified it is even possible to determine the position of more than one object at a time.

Preferably the method can comprise a step of determining the angle α based on the identified signals of step b). Thus no additional sensing means to establish the angle needs to be provided.

Advantageously, the method can comprise an additional step of determining the projection of the position of the object determined in step c) onto the surface of the second element. By projecting the position of the object onto the second element, the non touch based user interaction can simulate a touch based user interaction with the device.

Preferably the airborne signals are ultrasonic signals.

BRIEF DESCRIPTION OF THE SEVERAL VIEWS OF THE DRAWING(S)

Specific embodiments of the invention will be described in detail with respect to the enclosed figures.

Figure 2A:
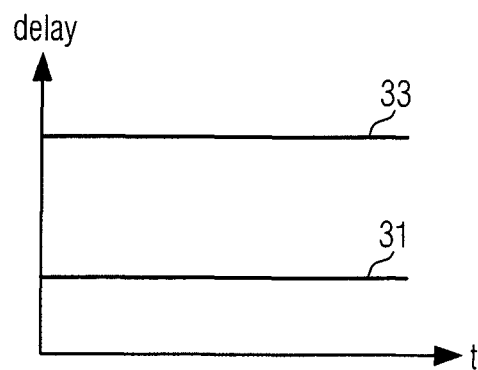
Figure 2B:
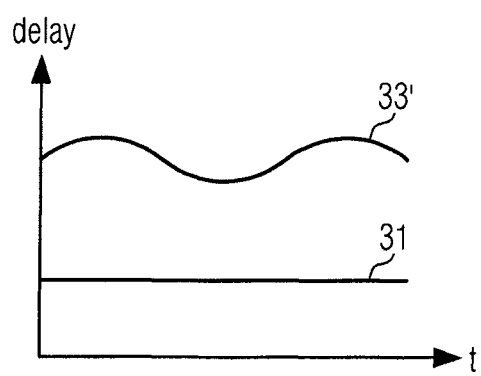
Figure 1B:
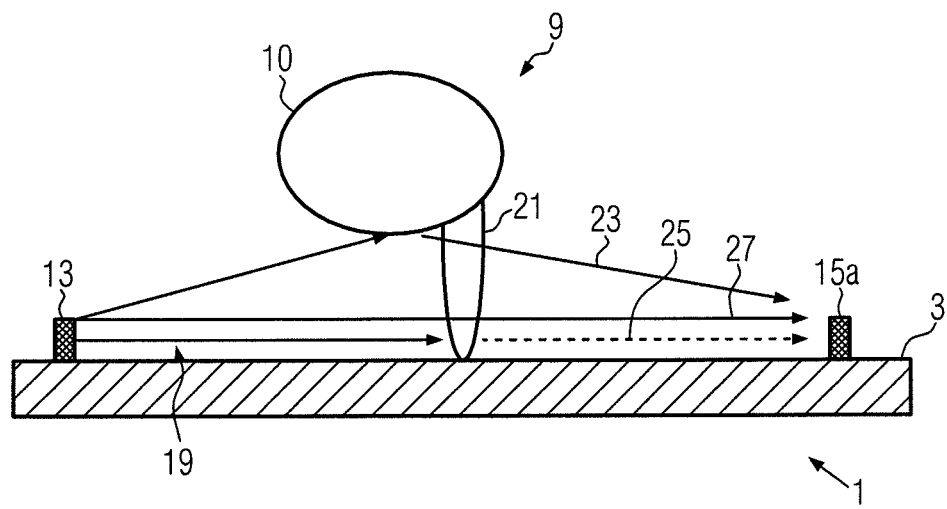
Figure 1C:
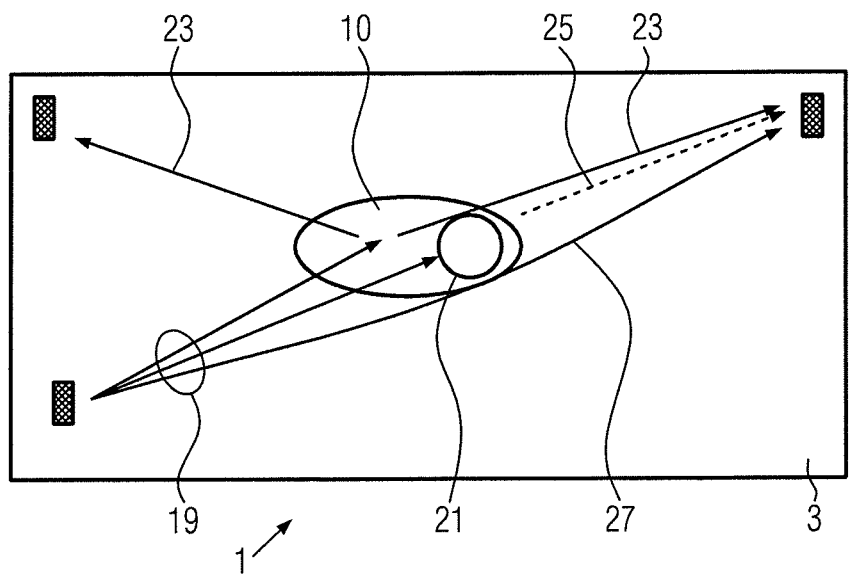
Figure 3A:
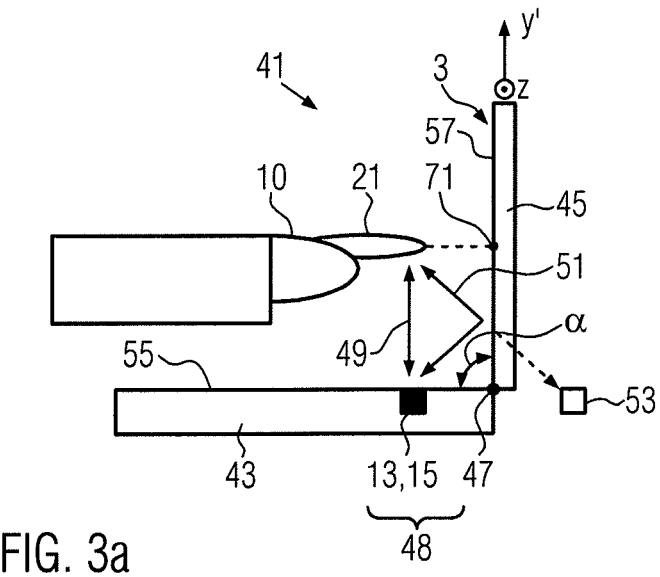
Figure 3B:
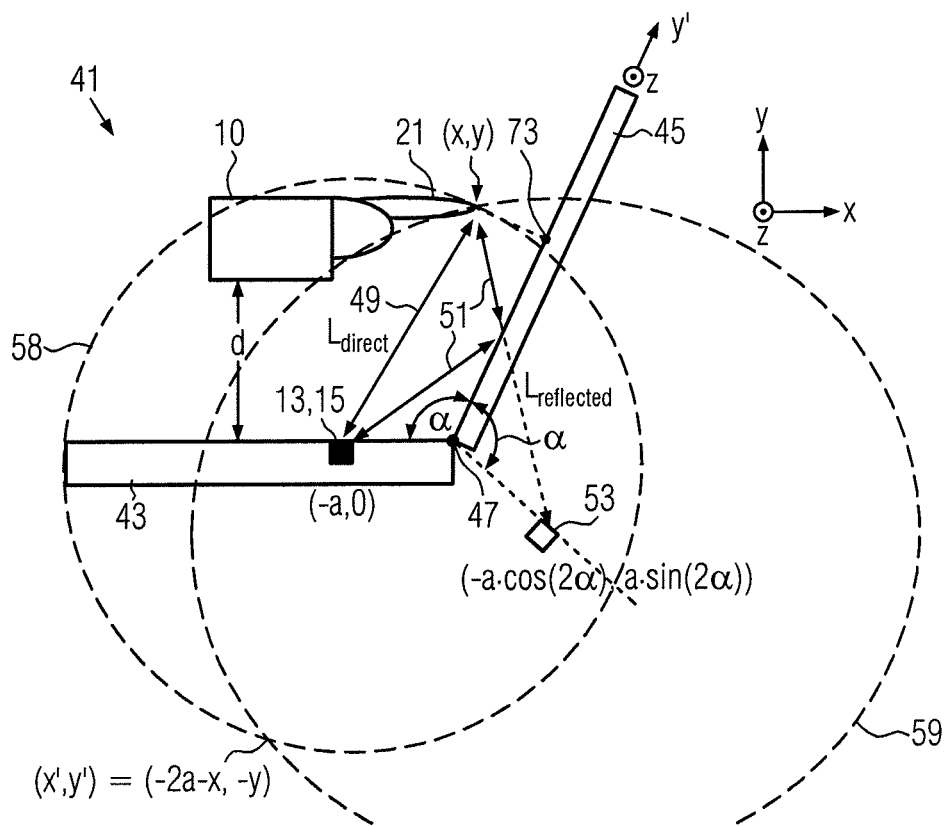

FIG. 1a illustrates schematically a touch sensitive device according to a first embodiment of the invention, FIG. 1b illustrates side view of the touch sensitive device of FIG. 1a FIG. 1c illustrates a plan view of a touch sensitive device according to another specific embodiment, FIG. 2a illustrates the time dependency of an airborne ultrasonic sensed signal in the absence of a user's movement, FIG. 2b illustrates the time dependency in the presence of a user's movement, FIG. 3a illustrates schematically a touch sensitive device according to a second and third embodiment of the invention, FIG. 3b illustrates schematically the touch sensitive device according the second and third embodiment for a second opening angle α

Figure 3C:
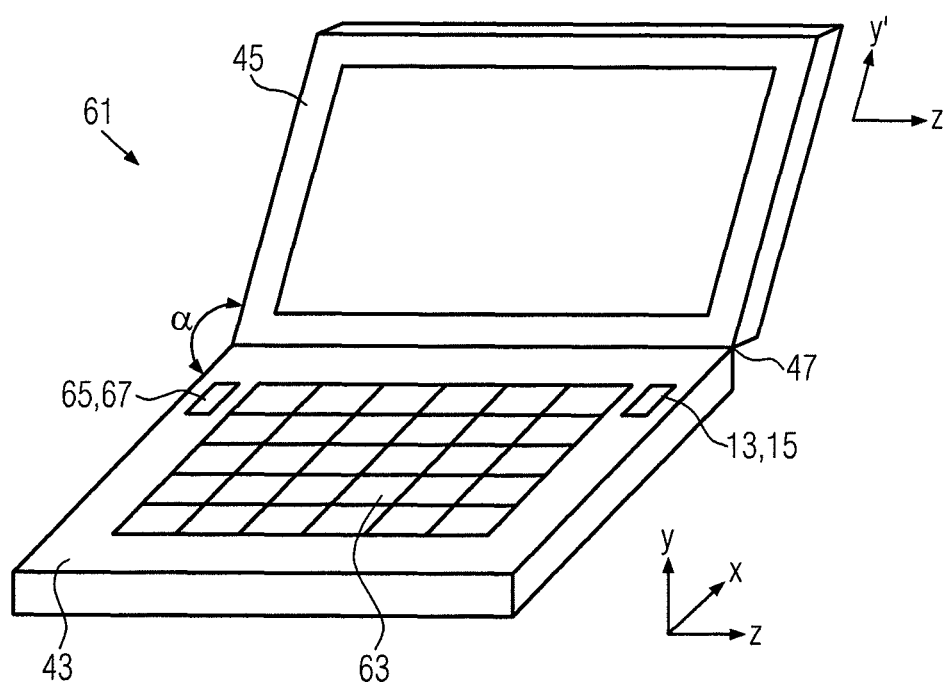
Figure 4:
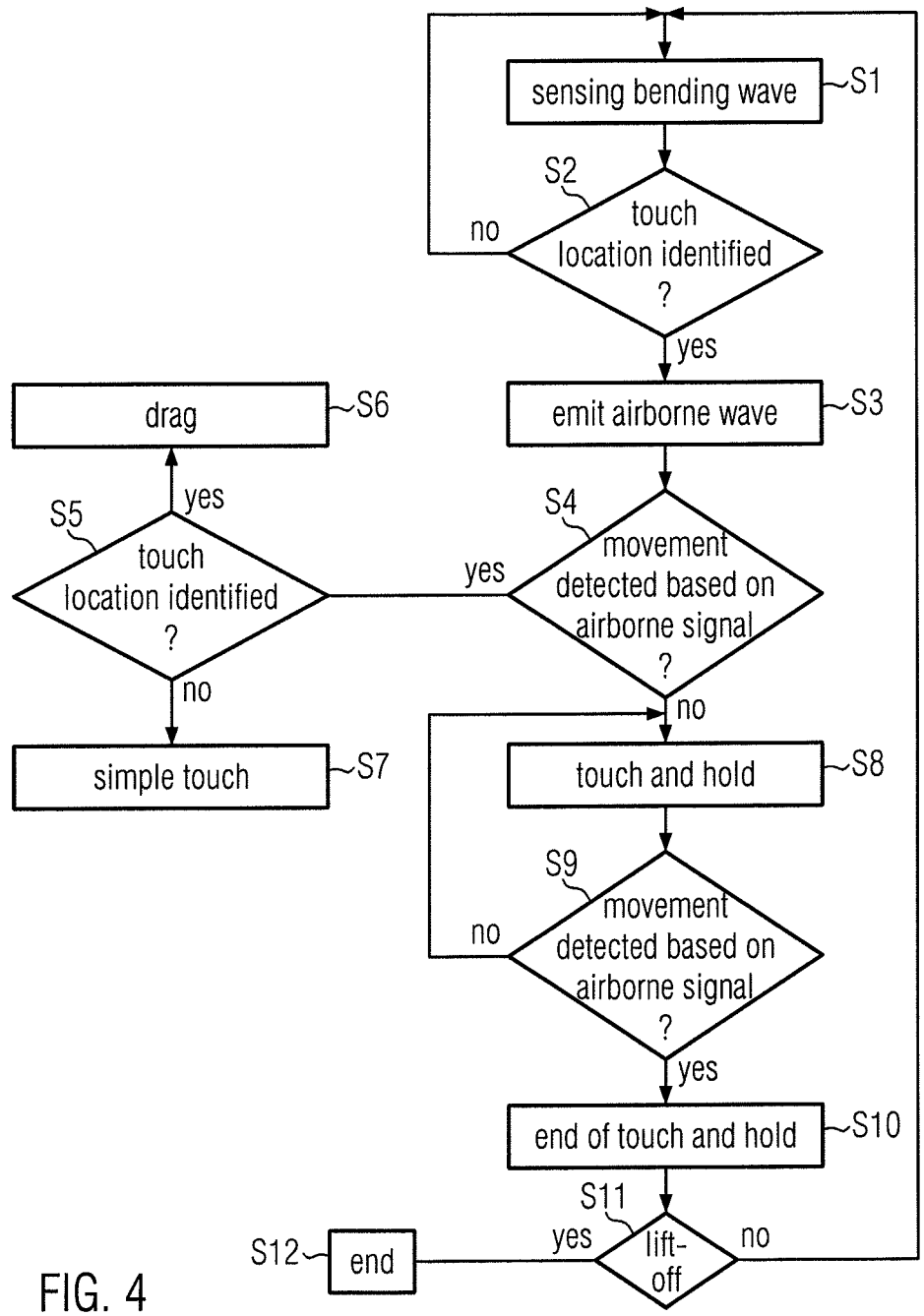
Figure 5A:
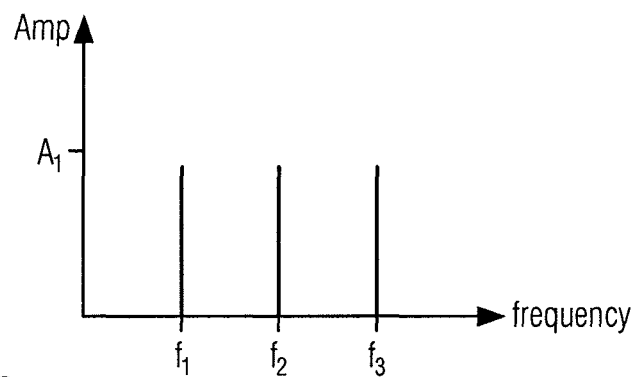
Figure 5B:
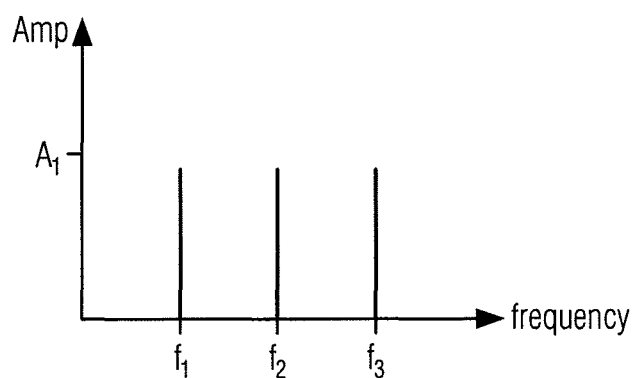
Figure 5C:
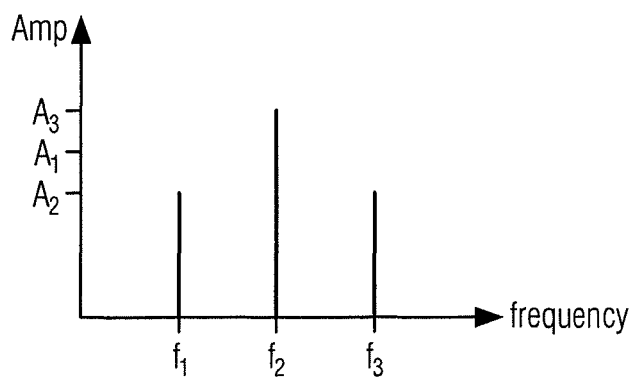
Figure 6:
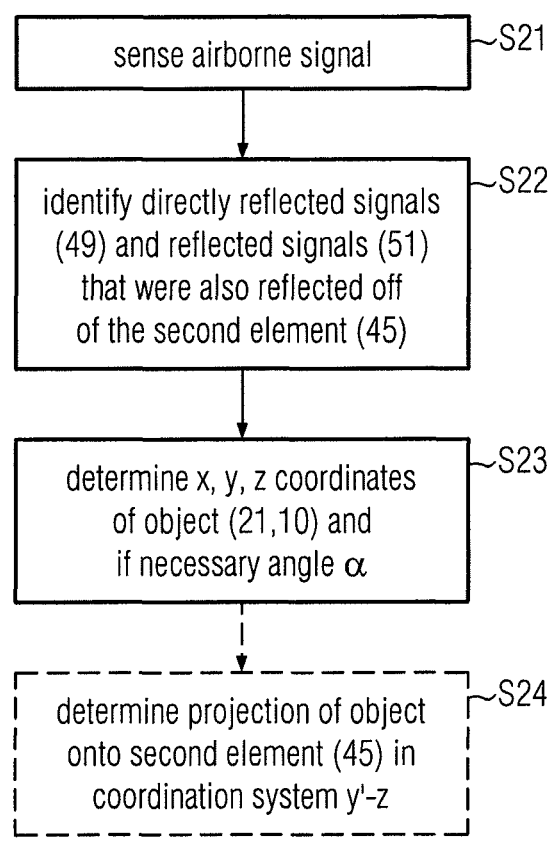

FIG. 3c illustrates schematically the second and third embodiment in a three dimensional view, FIG. 4 illustrates a block diagram, illustrating a fourth embodiment concerning a method according to the invention, FIG. 5a illustrates an emitted signal in the frequency domain, and FIG. 5b illustrates a sensed signal in the absence of a user, and FIG. 5c illustrates a sensed signal in the presence of a user, FIG. 6 illustrates a block diagram, illustrating a fifth embodiment concerning a second method according to the invention.

DETAILED DESCRIPTION OF THE INVENTION

FIG. 1a illustrates schematically a touch sensitive device 1 comprising a touch sensitive interaction surface 3 via which a user 9 can provide touch-based inputs to the touch sensitive device 1. The touch sensitive device 1 can be any electronic device including stationary devices like desktop computers, interactive digital signage, vending or automatic teller machines and information screens or hand-held mobile devices like a mobile phone, electronic reader, or a laptop according to various specific embodiments.

The user interaction surface 3 can for instance be part of a touch screen, but may belong to other parts of the device 1. The device further comprises an acoustic signal sensing means 5 and an analyzing unit 7. In this embodiment only one acoustic signal sensing means 5 is illustrated, however, more than one acoustic signal sensing means can be part of the device 1.

The acoustic signal sensing means 5 is configured such that, for a touch event during which the user 9 just taps at position 11 on the interaction surface 3, the location of the impact is identified and the action attributed to the location is carried out by the touch sensitive device 1.

The acoustic signal sensing means 5 is a transducer transforming the vibrations of e.g., a bending wave, travelling inside the user interaction surface 3 into electrical signals. The acoustic signal sensing means 5 can be any one of a piezoelectric transducer, magnetostrictive piezoelectric transducers, electromagnetic piezoelectric transducers, acoustic velocimeters, accelerometers, optical sensors, microelectromechanical system sensors (MEMs), or the like according to specific embodiments.

When a user touches the interaction surface 3 with an object such as his hand 10 at location 11 of the interaction surface 3, vibrations such as bending waves are injected in the interaction surface 3 and will be sensed by the acoustic signal sensing means 5. The sensed signal is then transferred to the analyzing unit 7 which is configured to determine the position 11 of the touch event.

The inventive touch sensitive device 1 according to a specific embodiment of the invention is, however, configured to discriminate between a simple touch event like a tap by a finger of the user or a stylus and a touch-and-hold event during which the user keeps his finger or the stylus in contact with the interaction surface at the same location 11. Typically, two different actions are carried out by the touch sensitive device in response to the two types of inputs.

Immediately following the tap on the interaction surface 11, the vibrations fade away, so that the analysis that was used to determine the location of an impact may not be applied to discriminate between the touch event and the touch-and-hold event.

According to the invention, the touch sensitive device 1 is configured to analyse the properties of an airborne signal to decide whether the touch event is accompanied by a hold event.

In this embodiment, the touch sensitive device 1 comprises an ultrasound signal emitting means 13 and two ultrasound sensing means 15a and 15b. The ultrasound signal emitting means 13 is configured to generate ultrasonic waves 19 that travel over the surface 17 of the touch sensitive device 1. The arrangement of emitters 13 and sensing means 15a and 15b in FIG. 1a represents only one of a plurality of possible arrangements. According to variants more than one emitting means 13 and/or more or less than two sensing means 15a and 15b could be provided distributed over the interaction surface. In one particular advantageous embodiment of the invention the electronic device comprises a telephone and/or a camera means and as such, the emitting means 13 can be the speaker of the telephone means and the sensing means 15a/15b can be the microphone of the telephone and/or camera means.

The ultrasonic wave 19 travelling over the interaction surface 3 is sensed by the sensing means 15a, 15b and the signal is forwarded to the analyzing unit 7 for further processing.

As the sensing of vibrations travelling inside the interaction surface 3 by the acoustic signal sensing means 5 and the sensing of ultrasonic waves 19 which are traveling above and/or over the interaction surface 3, by the ultrasound sensing means 15a/15b relate to two different physical phenomena, the inventive device uses two distinct sensing means.

FIGS. 1b and 1c illustrate schematically the touch sensitive device 1 in a side and top view. The user 9 touches the interaction surface 3 with a finger 21 of his hand 10. FIGS. 1b and 1c furthermore illustrate how the presence of a user's hand 10 can perturb the propagation of the airborne ultrasound wave 19 traveling above and/or over the user interaction surface 3 from the emitter 13 to the sensing means 15a.

First of all, the presence of the hand 10 and finger 9 can lead to reflections/echoes 23 from the hand 10 and/or finger 21. Furthermore, the propagation of the airborne ultrasonic wave 19 can be blocked by the presence of the finger 21, thereby leading to a shadowing effect 25. As a third mode, diffraction effects may occur leading to diffracted beams 27.

FIG. 2a illustrates the kind of signal sensed by the sensing means 15a in the absence of a movement on the interaction surface 3. The x-axis corresponds to scan number or scan time and the y-axis corresponds to an acoustic delay time representative of a value of the time the ultrasonic signal takes to reach the sensing means 15. Given a speed of sound of about ⅓ kilometer per second, measured acoustic delay times are of order one millisecond or less while the human reaction time of greater than 10 milliseconds motivates a much larger time scale for the horizontal scan time axes in FIG. 2. For example, algorithms may process signals for 10 sequential scans, one every millisecond, for a range of delay times from zero to one millisecond. The plurality of lines corresponds to various propagation paths, with and without reflection of the airborne ultrasound wave. For instance, the acoustic ultrasound wave 19 can travel on a direct path to the sensing means 15, thus corresponding to the shortest acoustic delay (see line with reference 31), whereas a part of the acoustic ultrasound wave 23 that e.g. gets reflected by the hand 10 or finger 21 of the user 9 reaches the sensing means 15a at a later time (see line with reference 33).

FIG. 2b illustrates the same graph, however, in a situation in which the user moves his finger 21 over the interaction surface 3. In this case the acoustic ultrasound delay of the reflected part (see line with reference 33') changes or even disappears, if the user 9 removes his finger 21 (and hand 10).

Thus by analyzing the evolution of the reflected airborne signal 33/33' using the analyzing unit 7, the system can easily and reliably discriminate between a state of no motion—flat lines like in FIG. 2a—and a state of motion—presence of wiggles or slight variations in the reflected signal 33' in FIG. 2b.

According to a specific embodiment of the invention, the decision whether the touch event is accompanied by a hold action is based on identifying these two states in combination with the fact of recognizing touch localization based on the vibrations sensed by the sensing means 5.

FIG. 3a illustrates a second embodiment of touch sensitive device 41 comprising a touch sensitive interaction surface 3 and an ultrasound signal emitting means 13 and at least one ultrasound sensing means 15 like in the first embodiment. However, the ultrasound signal emitting means 13 and the ultrasound sensing means 15 in this embodiment are arranged on or in a first element 43 of the touch sensitive device 41, whereas the touch sensitive user interaction surface 3 is arranged on or in a second element 45. The first element 43 may relate to a main body of the electronic device 41 containing a keyboard, processor, etc. whereas the second element 45 may relate to a lid containing a display. The display in the lid of the electronic device then comprises the touch sensitive interaction surface 3, e.g. based on a bending wave touch system, as described above.

Here the ultrasound signal emitting means 13 and at least one ultrasound sensing means 15 are illustrated as one ultrasonic transducer. Of course there could also be two distinct devices or more than just one ultrasound sensing means 15 or more than just one ultrasound emitting device 13. Typically the ultrasound signal emitting means 13 and at least one ultrasound sensing means 15 are arranged such that the ultrasonic waves are provided over the entire width (perpendicular to the drawing plane of FIG. 3) of the second element 45. According to a variant further transducers and/or emitters and/or sensing means could be provided in or on the second element 45.

The first and second elements 43 and 45 are linked to each other and form an angle α with respect to each other. In this embodiment the first and second element are linked by a hinge portion 47 so that the device 41 can be opened and closed, but according to a variant the angle α could also be fixed. The electronic device 41 can for instance be a clamshell laptop computer or any other foldable portable device like a mobile phone or a playing console. In the case of such devices, the space around the display in the second element 45 is typically rather restricted, so that the analysis of the properties of the sensed airborne signal to decide whether the touch event is accompanied by a hold event or not can still be implemented without having to enlarge the surface of the second element 45.

The ultrasound emitting means 13 as well as the at least one ultrasound sensing means 15 are arranged in the edge region 48 of the first element 43 which is adjacent the second element 45, more precisely at a predetermined distance from the hinge portion 47.

In this embodiment ultrasonic waves are emitted by the ultrasound emitting means 13 and are reflected or diffracted back to the at least one sensing means 15. In this embodiment, the possible acoustic paths for airborne reflections do however include more than one reflection path. In addition to the direct echo path 49 from the users hand 10 or finger 21, the ultrasound sensing means 15 in the first element 43 of the electronic device 41 e.g. also support acoustic paths in which the emitted ultrasound wave is reflected off the surface of the second element 45 via reflection path 51 before echoing off the user's finger 10 or finger 21 and again reflects off the second element 45 before being sensed by the ultrasound sensing means 15 (either the same or different as the emitting transducer) in or on the first element 43. Also of interest are signals from echo paths involving one reflection off of the second element 45 such as when ultrasonic waves emitted from the emitting means 13 travel directly to finger 21, are reflected from finger 21 and reflected again off the second element 45 before detection by ultrasound sensing means 15. Similarly, the ultrasonic waves may be reflected off of the second element 45 on the way to the finger 21 and then take a direct path to the ultrasound sensing means 15 on the way back from the finger 21.

As illustrated in FIG. 3a, such ultrasound reflections off the second element 45 effectively create virtual locations 53 of ultrasonic transducers behind the second element 45 at mirror locations with respect to the physical transducer locations (emitter 13 and/or sensing means 15) on or within the first element 43 of the electronic device 41.

Delay times, comparable to the ones illustrated in FIG. 2b, associated with such virtual transducer locations 53 provide additional information to more reliably determine the presence of a hold touch event. In addition, the sensed signal properties may even be exploited to obtain information about the position of the user hand with respect to the touch surface on the second element 45.

The device according to FIG. 3a also represents the device of independent claim 15 according to a third embodiment of the invention. The means for emitting 13 an airborne signal and the means for sensing 15 on the first element 45 according to the fourth embodiment are not used to determine the presence of a hold event but are used to determine the position of the finger 21 of the user relative to the second surface 57 of the second element 45, based on the properties of the sensed signals, like their time delay. In this case the system build up by the means for emitting 13 and the means for sensing 15 can replace a touch sensitive user interaction surface 3. In this case a user can interact with a display on the second element 45 without having to touch it (non touch based interaction).

The angle between the first surface 55 of the first element 43 and the second surface 57 of the second element 45 is not necessarily 90° as shown in FIG. 3a, but more generally can be an angle α as illustrated in FIG. 3b. Considering the case than the means for emitting 13 and the means for sensing 15 are either co-located or one and the same, the virtual location 53 is the same distance from hinge 47 and emitting and sensing means 13 and 15, but rotated about the hinge by twice the angle α. Defining X and Y axes as shown in FIG. 3b with the origin (x,y)=(0,0) at the hinge, and defining "a" as the distance from the hinge to emitting and sensing means 13 and 15, the coordinates of emitting and sensing means 13 and 15 is (x,y)=(−a,0) and the coordinates of the virtual location 53 is (−a·cos(2α), a·sin(2α)).

The direct echo path 49 is associated with an echo delay time $T_{direct}$ and the distance between the finger 21 and the emitting and sensing means 13 and 15 is $L_{direct}$. Likewise the reflection path 51 is associated with an echo delay time $T_{reflection}$ and the distance between the finger 21 and the virtual location 53 is $L_{reflection}$. These echo delay times and corresponding distances are related by the following formulas where V is the velocity of ultrasound in air.

$$L_{direct}=V \cdot T_{direct}/2$$

$$L_{reflection}=V \cdot T_{reflection}/2$$

The echo delay time corresponding to a path with only one reflection off the second element 45, like already mentioned above, is the average of the direct and reflected echo delay times, namely, $(T_{direct}+T_{reflection})/2$ and provides redundant information to improve measurements of $T_{direct}$ and $T_{reflection}$. From measurements of $T_{direct}$ and $T_{reflection}$ the distances $L_{direct}$ and $L_{reflection}$ may be determined.

Assuming for the moment that the finger 21 and emitting and sensing means 13 and 15 and the virtual location 53 are all in the same X/Y plane, the (x,y) coordinates of the finger 21 may be determined from the intersection of a circle 58 of radius $L_{direct}$ centered on the emitting and sensing means 13 and 15 and of a second circle 59 of radius $L_{reflection}$ centered on the virtual location 53. In terms of algebraic formulas this corresponds to finding the coordinates (x,y) that solved the following two simultaneous equations.

$$L_{direct}^2=(x+a)^2+y^2$$

$$L_{reflection}^2=(x+a \cdot \cos(2\alpha))^2+(y-a \cdot \sin(2\alpha))^2$$

As shown in FIG. 3b, the two circles 58 and 59 intersect not only at finger 21 position (x,y), but also at an unphysical position (x',y')=(−2α−x, −y) below first element 43. The unphysical position (x',y') will also satisfy the above two equations but can easily be eliminated by accepting only solutions with positive values of y, that is, above the first element 43.

While the measurement of two quantities such as $T_{direct}$ and $T_{reflection}$ is sufficient to determine the position of a point in two dimensions, it is not sufficient to determine a point in three dimensions. Continuing to considering the case than the means for emitting 13 and the means for sensing 15 are either co-located or one and the same, but no longer assuming the finger 21 to be in the same X/Y plane as the virtual location 53 and emitting and sensing means 13 and 15, the circles in FIG. 3b are replaced by a sphere of radius $L_{direct}$ centered on the emitting and sensing means 13 and 15 and of a sphere of radius $L_{reflection}$ centered on the virtual location 53. The intersections of these two spheres, or equivalently the solution of the below two simultaneous equations with three unknowns x, y and z(=coordinate perpendicular to x and y) is a circle including points (x,y) and (x',y') and in a plane perpendicular to a line through virtual location 53 and emitting and sensing means 13 and 15.

$$L_{direct}^2 = (x+a)^2 + y^2 + z^2$$

$$L_{reflection}^2 = (x + a \cdot \cos(2\alpha))^2 + (y - a \cdot \sin(2\alpha))^2 + z^2$$

Additional emitting means 13 and/or additional sensing means 15 may provide the additional measurements that are needed to determine the three-dimensional coordinates of finger 21. FIG. 3c illustrates schematically a variant of the device according to the third embodiment in a three dimensional view. The device 61 according to this variant comprises the same features as the device illustrated in FIGS. 3a and 3b. Elements with reference numerals as already used in the description of FIGS. 3a and 3b are therefore not described in detail again but reference is made to the corresponding description of FIGS. 3a and 3b.

The device 61, which can be a laptop, comprises a first co-located emitting and sensing means 13 and 15 to the right of a keyboard 63 in first element 43 and a second co-located emitting and sensing means 65, 67 to the left of the keyboard 63 in the first element 43. Thus compared to the situation described above there will be direct and reflected paths (reflected off the second element 45) to both the first and second co-located emitting and sensing means 13, 15 and 65, 67, which provides four equations with three unknowns (x,y,z) which is sufficient to determine the position of finger 21 in three dimensions and also provides some redundant information which could be used for noise rejection.

Without echo signals involving reflections off of the second element 45 and hence no measurement of $T_{reflection}$ and determination of $L_{reflection}$, a first and second co-located emitting and sensing means would provide only two equations for three unknowns (x,y,z) and would be incapable of determining the (x,y,z) coordinates of finger 21. Hence the reflections the second element 45 are not considered undesired backgrounds but are used as essential information with which to determine finger 21 position in up to three dimensions.

While it is an option for emitting means 13 and sensing means 15 to be co-located, this is not a requirement. The underlying principles for the case of separated emitting means 13 and sensing means 15 essentially remain the same and the equations as described above can be adapted accordingly.

Additional signals involving reflections off of second element 45 provide useful additional information from which to determine positions of one or even more objects, e.g. one or more fingers 21 of a user's hand or more fingers 21. This includes, in the scenario discussed above of left and right co-located emitting and sensing means in which the left sensing means 67 detects signals resulting from right emitting means 13 and vice versa. In addition more than two pairs of emitting and sensing means can be used to resolve more complex interaction schemes. Thus more complex interaction schemes like multi-touch and/or dragging gestures can be identified by the device 61 according to the invention. To be able to discriminate between signals emitted from the left and right emitting means, the left and right emitted signals can have a different frequency spectrum, different timing, or the like.

The above analysis assumes that the angle α between first element 43 and second element 45 is known or can be determined. One option to determine the angle α is that hinge 47 contains a means for measuring the angle α is incorporated into the device 41 or 61, in particular in the hinge 47. The measured value is then communicated to an appropriate processing means, e.g. a microprocessor, to determine the position of the object 21. Another possibility is that in the absence of a touch or finger 21, the sensing means 15 is able to detect echoes of ultrasonic waves from emitting means 13 off of second element 45 and from such signals the processing means determines α. This can for instance be achieved by comparing live no-touch signals with a data base of no-touch signals for a range of values of angle α. According to a further possibility, advantage is taken of the plurality of sensed signals. In cases such as discussed above when the number of measurements used to determine a finger 21 position (x,y,z) exceeds three, the parameter α in the above equations can be considered not as a predetermined constant, but as a fourth unknown to be determined along with (x,y,z) from the set of simultaneous equations that need to be satisfied. As the hinge angle parameter α is likely to vary much less often than finger 21 coordinates (x,y,z), the measurement of a does not need to be fully real-time and can be regarded as something to initially calibrate and periodically check and recalibration, perhaps using statistical methods in improve precision.

Knowing the x, y, z coordinates of object 10, 25 and the angle α it is furthermore possible to determine the position of the object 10, 25 relative to any position on the second element 45. In particular, it becomes possible to determine a projection of the object 10, 25 onto the second element 45 and the coordinate system y'-z attached to the second element 45. This is illustrated by reference numeral 71 in FIG. 3a and reference numeral 73 in FIG. 3b. For a given distance d of the object 10 or 21, the y' coordinate of the projection onto the second element thus changes as a function of the angle α. One choice for the direction of projection is to perpendicular to second surface 57. This is the case illustrated with reference numeral 71 in FIG. 3a and reference numeral 73 of FIG. 3b. If the user arranges hinge angle α so that second surface 57 is perpendicular to the user's line of sight, then the finger 21 will appear to be over the displayed image portion with coordinate y'. Other choices of projection direction may be used, such as the direction of the user's line of sight when the hinge angle α results in second surface 57 that is not perpendicular to the user's line of sight.

The device according to the second and third embodiment is typically used for opening angles α which are less then 180°, in particular less than 160°, even further preferred in a range between 45° and 160°.

The airborne signals in the electronic device 41 according to the third embodiment and its variant 61 are used to replace a touch based user interaction surface by a non touch based user interaction. Like mentioned above, the position of the object 10, 25 can be determined in three dimensions within the coordinate system x-y-z and/or as a projection onto the second element in a coordinate system y'-z. It is furthermore also possible to combine the non touch based interaction based on airborne signals with a touch based user interaction means on the second element 45. This could touch based user interaction means could e.g. correspond to the touch based user interaction surface 3 as described in the second embodiment or any other touch based user interaction means, e.g. based on a capacitive, an inductive or an acoustic technology. In this case a user interaction with the device based on up to five dimensions (three non touch based and two touch based) can be realized.

FIG. 4 illustrates a method according to a fourth embodiment of the invention. FIG. 4 furthermore illustrates how the inventive touch sensitive device 1 or 41 or 61 can be used to discriminate between touch events and touch-and-hold touch events.

During step S1, the acoustic signal sensing means 5 senses signals corresponding to vibrations such as bending waves propagating inside the interaction surface 3. In many applications the interaction surface 3 takes the form of a more or less uniform plate for which propagating vibrations take the form of $A_0$ order Lamb waves, commonly referred to as bending waves. In the context of this document the term "bending waves" is to be interpreted generally as vibration propagation from the touch point to acoustic signal sensing means 5 even if the interaction surface deviates in geometry and structure from a uniform plate.

The sensed signal is forwarded to the analyzing unit 7. Based on the properties of the sensed signal, the analyzing unit 7 determines whether a user 9 has touched the interaction surface 3 at a certain location, here touch location 11 and may output the coordinates of the touch location to a further processing unit or not. If no touch event is detected, step S1 is repeated again.

Upon detection of a touch interaction by the user 11 with the touch sensitive surface 3, the analyzing unit 7 instructs the ultrasound signal emitting means 13 to emit an airborne ultrasonic wave 19 above and/or over the surface 17 of the device 1 (step S3).

The ultrasound sensing means 15a/15b capture the emitted airborne ultrasonic wave having travelled above and/or over the surface 17 and forward the sensed signal to the analyzing unit 7. Based on the properties of the sensed airborne ultrasonic signal, as illustrated in FIGS. 2a and 2b, the analyzing unit 7 can determine in step S4 whether the user's finger or the stylus held in his hand moved or not after the touch event identified in step S2.

If a movement of the user's finger or stylus has been identified, the process proceeds with step S5 during which the analyzing unit 7 checks whether, based on signal sensed by the acoustic signal sensing means 5, a new touch location on the interaction surface 3 can be identified or not. If a new touch location can be identified (step S6), the analyzing unit 7 will identify a drag over the interaction surface and will provide the corresponding output to the further processing means. If no new touch location can be identified (step S7), the analyzing unit 7 can identify that the interaction between the user 9 and the device 1 relates to a simple tap, thus a touch event without hold.

If during step S4 the analysis of the airborne ultrasonic signal leads to the decision that no movement occurred by the user 9 after the touch localization in step S2, the analyzing unit 7 determines that the interaction relates to a touch-and-hold event (step S8) and provides the corresponding output to the further processing unit(s) of the electronic device 1.

During step S9, the analyzing unit continues to check whether a motion of the user 9 can be identified based on the airborne signal properties as illustrated in FIGS. 2a and 2b. As long as no motion is detected, the analyzing unit 7 considers that the hold action continues. When a motion is detected, the analyzing unit 7 identifies the end of the hold action in step S10.

This may relate to a lift-off of the user's finger 21 from the interaction surface. The lift-off event can, in addition or in an alternative, also be identified using the signal sensed by the acoustic signal sensing means 5 as the lift off action may also lead to the formation of vibrations such as a bending wave travelling inside the interaction surface 3. If a lift-off is detected in step S11, the user interaction is terminated (S12).

If after the detection of motion in step S9 indicating the end of a touch-and-hold event, no lift-off is detected but a new bending wave is detected, the process restarts with step S1. A new touch location can be identified by the analyzing unit 7 based on the signal sensed by the acoustic signal sensing means 5. The touch location will be different to the one identified at the beginning of the interaction event, the analyzing unit 7 may decide that directly after the touch-and-hold event a drag event takes place, during which the user 9 first touches the interaction surfaces for a longer time and then keeps touching the interaction surface but starts moving over the interaction surface 3 to a different location.

Instead of looking at the time dependency, it is also possible to analyze the sensed airborne signal in the frequency domain, as illustrated in FIGS. 5a to 5c.

According to a specific embodiment, FIG. 5a illustrates schematically that the ultrasonic wave emitted by the ultrasound signal emitting means 13 is built up out of the sum of three different frequency contributions having the same amplitude and/or phase. Of course, the emitted ultrasonic wave can be build up out of more or less frequency contributions with arbitrary amplitude and or phase ratios which, however, have to be known in advance.

FIG. 5b illustrates the frequency contributions of the signal sensed by the airborne signal sensing means 15 in the absence of any object on the interaction surface 3. Unsurprisingly the amplitude and/or phase ratios among the various frequency contributions remain the same.

FIG. 5c then illustrates the frequency contributions in the presence of an object on the interaction surface 3. In this case, due to reflection, absorption and/or diffraction of the airborne ultrasonic signal at the object, the ratio of the amplitudes and or phase of the frequency contributions will change.

These patterns could also be linked to a particular position of the object on the interaction surface 3. Therefore, a localization of the user's hand 10 or finger (or stylus held in his hand) 21 on the interaction surface 3 could be obtained by comparing the obtained pattern with a set of pre-recorded pattern at know locations. By comparing this information with the localization determined based on the vibrations travelling inside the interaction surface 3, it becomes possible to check that the hold signal is indeed based on the user's hand or finger which led to the detection of the touch.

As in the case described with respect to FIGS. 2a and 2b, changes in the amplitude and or phase ratios will indicate that the object on the surface is moving or not. Thus, in the presence of an object on the interaction surface 3 that does not move and if a touch location has been identified just before based on the properties of the vibrations or bending wave sensed by the acoustic signal sensing means 5, the analyzing unit 7 can decide that a touch-and-hold event took place or not.

With the inventive device and the inventive methods according to specific embodiments and their variants, touch-and-hold touch events can be reliably discriminated from simple touch events without a continued interaction.

Unlike in the prior art, this is achieved using acoustic signals travelling inside the user interaction surface 3 but also using airborne signals travelling above and/or over the user interaction surface 3. By using airborne signals, the method to detect hold events becomes independent of the materials used, their distribution inside the device and their geometry.

Thus compared to the prior art a further way of detecting touch-and-hold is provided by the invention which can be integrated into the electronic device using hardware, emitters and sensors, that might already be present, e.g. in telephones and/or cameras.

FIG. 6 illustrates a fifth embodiment of the invention. It relates to detecting the position of an object relative to a device. To describe the method use is made of the device 41 or 61 as illustrated in FIGS. 3a to 3c.

Step S21 consists in sensing airborne ultrasonic signals using the one or more sensing means 15 (67) provided in the first element of device 41 (or 61). The sensed signals relate to reflected signals originally emitted from the one or more emitting means 13 (or 65) and reflected off the object 10, 21 above the first element 43.

Subsequently, during step S22, the sensed airborne ultrasonic signals are analyzed to identify signal contributions that relate to reflected signals that were directly reflected from the object 10, 21, these kind of signals carry the reference number 49 in FIG. 3b, and to identify signal contributions that relate to reflected signals that were, in addition, reflected off of the second element, these kind of signals carry the reference number 51 in FIG. 3b. In addition, according to further variants, other kind of reflected signals like mentioned above (emitted by emitting means 13 and sensed by sensing means 67 with or without reflections off the second element, etc. could also be identified.

Based on the various types of sensed signals, identified during step S22, the coordinates of object 10, 21 can then be determined in step S23 based e.g. on the equations established above. Knowing that the localization determination based on the reflected signals of type 51 leading to virtual sensing and emitting means 53 depends on the value of angle α, the method further either uses the value of angle α, known from a means for measuring the angle α or from previous measurements in the absence of an object or determines the angle α out the sensed signals in case more equations than unknown parameters can be established, like explained in detail above.

The coordinates x, y and z, together with the angular value a can then be used to input instructions corresponding to the position of the object relative to the second element 45.

Depending on the amount of measured signals it is furthermore possible to identify the position of not only one object relative to the second element 45 but also more than one. In addition, the change of position as a function of time can also be determined. Thereby it becomes possible to identify more complex interaction patterns, like multiple simultaneous non touching gestures.

According to a variant, illustrated in step S24, the method may furthermore comprise a step of determining a projection of the object 10, 21 onto the second element 45. This projection, illustrated by reference numeral 71 provides the position of the object in the coordinate system y'-z of the second element and can be just like a touch based user interaction on the second element 45.

With the inventive device and the inventive methods according to specific embodiments and their variants, the position of an object relative to a device can be determined in up to three dimensions. According to the invention advantage is taken from reflected signals reflected off the second element which can be attributed to additional "virtual" signal emitting means.

The features of various embodiments and their variants can be freely combined individually or in combination to obtain further realizations of the invention.

The invention claimed is:

1. An electronic device comprising a touch sensitive interaction surface, an acoustic signal sensor for sensing vibrations configured to propagate through the interaction surface, an airborne signal emitter, at least one airborne signal sensor, and a processor configured to:
   a) determine a touch location of a touch event based on vibrations propagating through the touch sensitive interaction surface; and
   b) determine whether the touch event comprises a hold touch event based on a sensed airborne signal, wherein the sensed airborne signal is emitted in response to detection of vibrations propagating through the interaction surface and a determination corresponding to an acoustic delay time in response to determining a state of non-motion.

2. The electronic device of claim 1, wherein the processor configured to determine whether the touch event comprises the hold touch event includes the processor configured to:
   control emission of the sensed airborne signal configured to propagate at least one of above or over the interaction surface; and
   sense properties of the emitted airborne signal.

3. The electronic device of claim 2, wherein the sensed airborne signal is emitted during step a).

4. The electronic device of claim 1, wherein the sensed airborne signal is an ultrasonic sound wave.

5. The electronic device of claim 1, wherein the processor configured to determine whether the touch event comprises the hold touch event includes the processor being configured to determine presence or absence of motion based on an evolution of the sensed airborne signal.

6. The electronic device of claim 5, wherein the processor configured to determine whether the touch event comprises hold touch event includes the processor being configured to detect the touch location in step a) and at least one of an absence of motion or an absence of the touch location.

7. The electronic device of claim 1, wherein determining whether touch event comprises the hold touch event is based on at least one of time of flight, echo delay, or amplitude and/or phase distribution as a function of frequency.

8. The electronic device of claim 1, wherein the airborne signal emitter is configured to emit an ultrasonic wave configured to propagate at least one of above or over the touch sensitive interaction surface.

9. The electronic device of claim 1, wherein the electronic device further comprises at least one of a telephone, a camera, a speaker, and a microphone, and wherein the speaker is configured to emit an airborne signal and the microphone is configured to sense the airborne signal.

10. The electronic device of claim 1 further comprising a first element and a second element configured to form an angle (α), wherein the first element comprises at least one of the airborne signal emitter or the airborne signal sensor for determining the hold touch event on the touch sensitive interaction surface and the second element comprises the touch sensitive interaction surface.

11. The electronic device of claim 10, wherein the airborne signal emitter and the airborne signal sensor are on or in the first element.

12. The electronic device of claim 11, wherein the processor is configured to identify the hold touch event based on an airborne signal reflected off the second element comprising the touch sensitive interaction surface and sensed by at least one of the airborne signal sensor provided in or on the first element.

13. The electronic device of claim 10, wherein the first element and the second element are linked to each other by a hinge portion forming the angle ($\alpha$) between the first element and the second element.

14. The electronic device of claim 10, wherein the processor is configured to identify the angle ($\alpha$) based on an airborne signal reflected off the second element and sensed by the airborne signal sensor provided at least one of in or on the first element.

15. The electronic device of claim 10, wherein the angle ($\alpha$) is less than 180°.

16. The electronic device of claim 10, wherein the angle ($\alpha$) is less than 160°.

17. The electronic device of claim 10, wherein the angle ($\alpha$) is less between 45° and 160°.

18. The electronic device of claim 1 comprising a first element with a first surface and a second element with a second surface, the first and second surface forming an angle ($\alpha$) with respect to each other, wherein at least one of the airborne signal emitter or the airborne signal sensor is provided on or in the first element, and wherein the processor is configured to determine a position of at least one object relative to the second surface based on sensed airborne signals.

19. The electronic device of claim 18, wherein the processor is configured to determine the position of the at least one object based on at least one of first airborne signals directly reflected off the object or second airborne signals that were reflected off the at least one object and the second surface.

20. The electronic device of claim 18, wherein the processor is configured to determine the position of the object in at least one of the plane a plane of the second surface or perpendicular to the plane of the second surface.

21. The electronic device of claim 18, wherein the second element further comprises the touch sensitive interaction surface and the processor is configured to determine the location of the object relative to the touch sensitive interaction surface in an area outside the touch sensitive interaction surface.

22. The electronic device of claim 10, wherein the first element, the second element, and a hinge portion form a clamshell housing.

23. A method for determining a hold touch event on a touch sensitive interaction surface of a touch sensing device comprising the steps of:
   a) determining a touch location of a touch event based on vibrations propagating through the interaction surface; and
   b) determining whether the touch event comprises a hold touch event based on a sensed airborne signal, wherein the sensed airborne signal is emitted by an airborne signal emitter of the touch sensing device and in response to detection of vibrations propagating through the interaction surface and a determination corresponding to an acoustic delay time in response to determining a state of non-motion.

24. The method of claim 23, wherein determining whether the touch event comprises a hold touch event comprises emitting an airborne signal configured to propagate at least one of above or over the interaction surface and sensing properties of the emitted airborne signal.

25. The method of claim 23, wherein determining whether the touch event comprises the hold touch event includes determining presence or absence of motion based on an evolution of the sensed airborne signal.

26. The method of claim 23, wherein determining whether the touch event comprises the hold touch event includes detecting the touch location in step a) and at least one of an absence of motion or an absence of the touch location.

27. A computer program product including computer executable instructions stored thereon for determining a hold touch event on a touch sensitive interaction surface of a touch sensing device, the computer program product comprising at least one non-transitory computer-readable storage medium having computer-executable program code instructions stored therein, the computer-executable program code instructions comprising program code instructions to:
   a) determine a touch location of a touch event based on vibrations propagating through the interaction surface; and
   b) determine whether the touch event comprises a hold touch event based on a sensed airborne signal, wherein the sensed airborne signal is emitted by an airborne signal emitter of the touch sensing device and in response to detection of vibrations propagating through the interaction surface and a determination corresponding to an acoustic delay time in response to determining a state of non-motion.

* * * * *

UNITED STATES PATENT AND TRADEMARK OFFICE
CERTIFICATE OF CORRECTION

PATENT NO.        : 9,760,215 B2
APPLICATION NO.   : 13/650798
DATED             : September 12, 2017
INVENTOR(S)       : Esteve et al.

Page 1 of 1

It is certified that error appears in the above-identified patent and that said Letters Patent is hereby corrected as shown below:

In the Claims

Column 17,
Line 46, delete "the plane".

Signed and Sealed this
Twenty-fourth Day of April, 2018

Andrei Iancu
*Director of the United States Patent and Trademark Office*